(12) United States Patent
Williams

(10) Patent No.: US 10,303,162 B2
(45) Date of Patent: May 28, 2019

(54) METHOD, SYSTEM, AND DEVICE FOR MONITORING OPERATIONS OF A SYSTEM ASSET

(71) Applicant: General Electric Company, Schenectady, NY (US)

(72) Inventor: Scott Terrell Williams, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/958,863

(22) Filed: Apr. 20, 2018

(65) Prior Publication Data

US 2018/0239346 A1   Aug. 23, 2018

Related U.S. Application Data

(63) Continuation of application No. 13/665,066, filed on Oct. 31, 2012, now Pat. No. 9,958,863.

(51) Int. Cl.
*G05B 23/02* (2006.01)

(52) U.S. Cl.
CPC .............................. *G05B 23/0221* (2013.01)

(58) Field of Classification Search
CPC .................................................. G05B 23/0221
See application file for complete search history.

(56) References Cited

U.S. PATENT DOCUMENTS

| | | | |
|---|---|---|---|
| 6,157,621 A | 12/2000 | Brown et al. | |
| 6,542,075 B2 | 4/2003 | Barker et al. | |
| 6,754,595 B1 | 6/2004 | Rozier et al. | |
| 7,457,869 B2 | 11/2008 | Kernan | |
| 8,056,130 B1 | 11/2011 | Njemanze et al. | |
| 8,126,574 B2 | 2/2012 | Discenzo et al. | |
| 2001/0050592 A1 | 12/2001 | Wright et al. | |
| 2002/0105428 A1 | 8/2002 | Benson et al. | |
| 2003/0093619 A1 | 5/2003 | Sugino et al. | |
| 2003/0172145 A1 | 9/2003 | Nguyen | |
| 2004/0002838 A1* | 1/2004 | Oliver | G06K 9/6293 703/2 |
| 2004/0201471 A1 | 10/2004 | Primm et al. | |
| 2005/0080520 A1 | 4/2005 | Kline et al. | |
| 2005/0086239 A1 | 4/2005 | Swann et al. | |

(Continued)

FOREIGN PATENT DOCUMENTS

WO        03029648 A1      4/2003

OTHER PUBLICATIONS

G Smith, "Development of a Generic Wind Farm Scada System", Jan. 1, 2001, XP055100108.
Search report from PCT/US2013/067405 dated Feb. 11, 2014.

*Primary Examiner* — Larry T Mackall
(74) *Attorney, Agent, or Firm* — Mintz Levin Cohn Ferris Glovsky and Popeo, P.C.

(57) ABSTRACT

A device for use in monitoring operation of a system asset includes an interface for receiving sensor data representative of an operating condition of the system asset, a memory device for storing the sensor data, and a processor coupled to the interface and to the memory device. The processor is configured to create a hierarchy of sensor data within the memory device, wherein the hierarchy comprises a first tier and a second tier, store a first level of the sensor data in the first tier, and store a second level of the sensor data in the second tier.

9 Claims, 3 Drawing Sheets

(56) References Cited

U.S. PATENT DOCUMENTS

| | | |
|---|---|---|
| 2005/0141706 A1 | 6/2005 | Regli et al. |
| 2005/0148828 A1 | 7/2005 | Lindsay |
| 2007/0139209 A1 | 6/2007 | Butalla et al. |
| 2008/0255902 A1 | 10/2008 | Poer et al. |
| 2008/0288306 A1 | 11/2008 | MacIntyre et al. |
| 2008/0305869 A1 | 12/2008 | Konforty et al. |
| 2009/0106521 A1 | 4/2009 | Whisnant et al. |
| 2009/0204232 A1 | 8/2009 | Guru et al. |
| 2009/0271364 A1 | 10/2009 | Hanking |
| 2009/0287335 A1 | 11/2009 | Kobayashi |
| 2010/0010968 A1 | 1/2010 | Redlich et al. |
| 2010/0063776 A1 | 3/2010 | Kayani |
| 2010/0229023 A1 | 9/2010 | Gross et al. |
| 2011/0145711 A1 | 6/2011 | Njemanze et al. |
| 2011/0224808 A1 | 9/2011 | Lucas et al. |
| 2012/0065802 A1 | 3/2012 | Seeber et al. |
| 2012/0158633 A1 | 6/2012 | Eder |

\* cited by examiner

METHOD, SYSTEM, AND DEVICE FOR MONITORING OPERATIONS OF A SYSTEM ASSET

CROSS-REFERENCE TO RELATED APPLICATIONS

This application is a continuation of, and claims priority to, U.S. patent application Ser. No. 13/665,066, filed Oct. 31, 2012, and entitled METHOD, SYSTEM, AND DEVICE FOR MONITORING OPERATIONS OF A SYSTEM ASSET, the entirety of which is incorporated herein by reference.

BACKGROUND

The present application relates generally to power systems and, more particularly, to methods and devices for use in monitoring operations of a system asset.

At least some known power systems include a plurality of components, such as generators, motors, fans, and/or other components. Such components are often positioned within a building such as a power plant or a factory. A building may include a plurality of system components that may fail and/or that may require maintenance. Such system components are often monitored to ensure that the components operate satisfactorily and/or to determine whether the components require maintenance.

To enable system components to be monitored, at least some known systems include a plurality of sensors coupled to, or positioned proximate to, the components. The sensors measure operating conditions of the components and transmit signals representative of the measured operating conditions to one or more monitoring systems. The monitoring systems may convert the signals to digital sensor data, and/or may store the sensor data in memory. However, storing such sensor data may require large amounts of memory over time, especially in systems that include a large number of sensors and/or in systems in which the sensors monitor and transmit data at frequent intervals.

To reduce an amount of memory consumed by sensor data, some known monitoring systems only store sensor data at predetermined or periodic intervals. However, the periodic storage of such monitoring systems may cause the monitoring systems to miss or to lose important sensor data. Accordingly, an ability to monitor the system components may be impaired or at least limited.

SUMMARY

In one embodiment, a device for use in monitoring operation of a system asset is provided that includes an interface for receiving sensor data representative of an operating condition of the system asset being monitored, a memory device for storing the sensor data, and a processor coupled to the interface and to the memory device. The processor is configured to create a hierarchy of sensor data within the memory device, wherein the hierarchy comprises a first tier and a second tier, store a first level of the sensor data in the first tier, and store a second level of the sensor data in the second tier.

In another embodiment, a system for use in monitoring operation of a system asset is provided that includes a data acquisition device including an interface for receiving sensor data representative of an operating condition of the system asset being monitored, a memory device for storing the sensor data, and a processor coupled to the interface and to the memory device. The processor is configured to create a hierarchy of sensor data within the memory device, wherein the hierarchy comprises a first tier and a second tier, store a first level of the sensor data in the first tier, and store a second level of the sensor data in the second tier. The system also includes a display device coupled to the data acquisition device. The display device is configured to display data representative of the second level of the sensor data.

In yet another embodiment, a method of monitoring a system asset is provided that includes creating a hierarchy of sensor data within a memory device, wherein the hierarchy includes a first tier and a second tier, receiving sensor data representative of an operating condition of the system asset being monitored, storing a first level of the sensor data in the first tier, storing a second level of the sensor data in the second tier, and displaying data representative of the second level of the sensor data on a display device.

DETAILED DESCRIPTION

Figure 1:
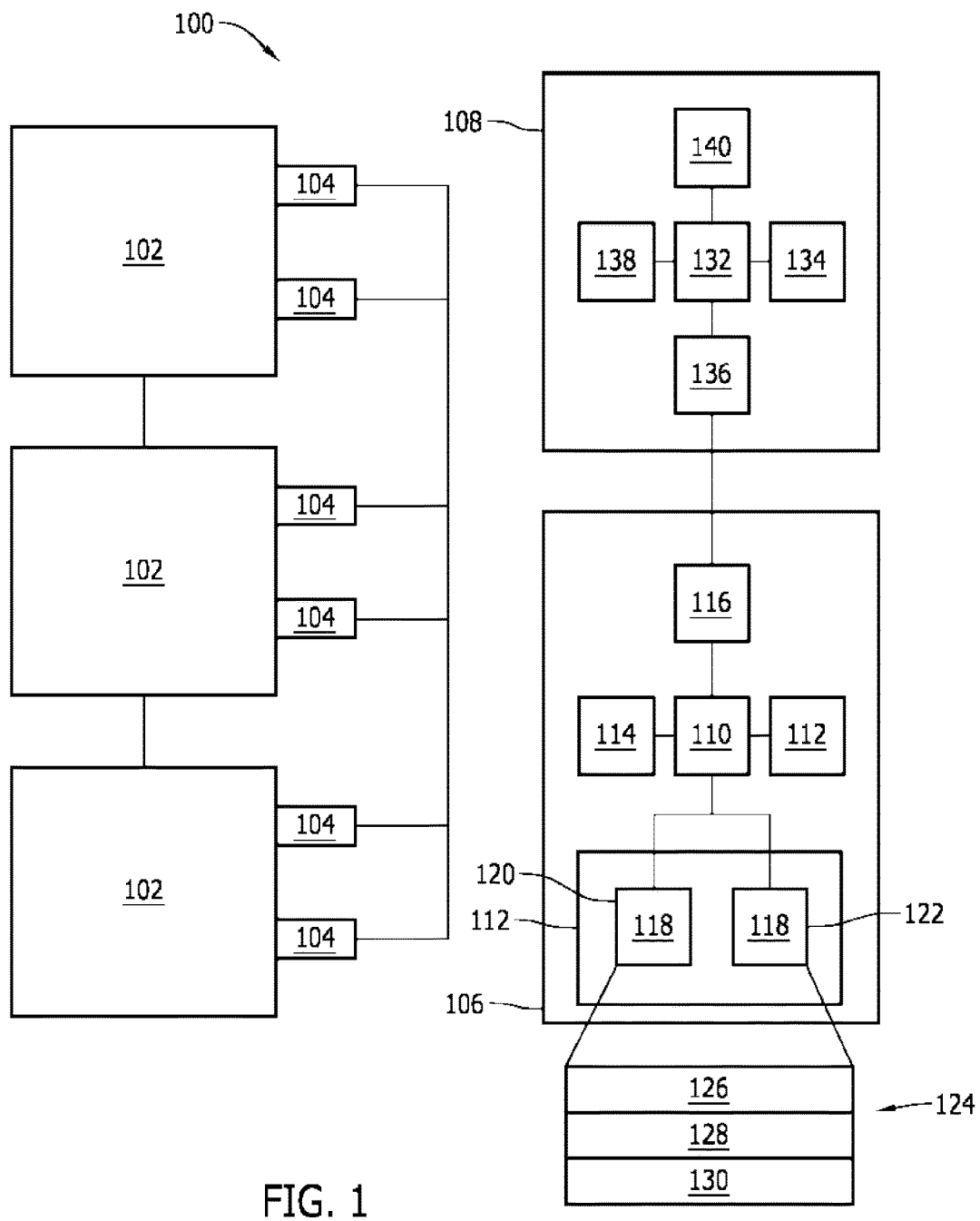
FIG. 1 is a block diagram of an exemplary system including a plurality of system assets.

FIG. 1 is a block diagram of an exemplary system 100 that includes a plurality of system assets 102. In the exemplary embodiment, system 100 may be, or may include, a factory, an industrial system or facility, a mill, a refinery, a manufacturing facility, a power generation plant or facility, and/or any other system that includes a plurality of system assets 102. System assets 102 may include, but are not limited to only including, machines, motors, generators, pumps, fans, computer systems or devices, sensors, and/or any other device or machine that enables system 100 to function as described herein.

In the exemplary embodiment, at least one sensor 104 is coupled to at least one system asset 102 for measuring an operating condition of asset 102. For example, if asset 102 is a rotating machine, sensors 104 may measure a vibration of a drive shaft of the associated machine, a rotational frequency or speed of the drive shaft, a temperature of the machine, a pressure within the machine, and/or any other operating condition of any component or device within, or coupled to, system 100.

System 100 also includes a data acquisition device 106 and a computing device 108 that is coupled to data acquisition device 106. In the exemplary embodiment, data acquisition device 106 includes a processor 110 coupled to one or more memory devices 112, a sensor interface 114 (also sometimes referred to as an input device), a communication interface 116, and one or more databases 118.

Processor 110 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 112 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 112 includes data and/or instructions that are executable by processor 110 (i.e., processor 110 is programmed by the instructions) to enable processor 110 to perform the functions described herein.

Sensor interface 114 is coupled to sensors 104 for receiving signals representative of measured operating conditions of assets 102. More specifically, sensor interface 114 receives signals from sensors 104 via a wireless connection and/or via a wired connection. In the exemplary embodiment, sensor interface 114 converts and/or adjusts signals received from sensors 104 for use with processor 110. In one embodiment, sensor interface 114 includes an analog-to-digital converter (ADC) that converts analog signals received from sensors 104 to digital data representative of the measured operating conditions (hereinafter referred to as "sensor data"), and the sensor data is transmitted to processor 110. In the exemplary embodiment, data acquisition device 106 determines a status of each system asset 102 and/or a status of the sensor data based on the sensor data received.

Communication interface 116 may include, without limitation, a network interface controller (NIC), a network adapter, a transceiver, or any other communication interface or device that enables data acquisition device 106 to operate as described herein. In the exemplary embodiment, communication interface 116 may couple to computing device 108 using any suitable wired or wireless network and/or communication protocol.

In the exemplary embodiment, databases 118 include a measurement database 120 and a reference database 122. Alternatively, databases 118 may include any other database, and/or measurement database 120 and reference database 122 may be combined into one database 118.

In one embodiment, databases 118 are included within one or more memory devices 112. Alternatively, databases 118 are stored within one or more remote storage devices, such as a network attached storage (NAS) device, an external hard drive, a remote computing device, and/or any other storage device that enables data acquisition device 106 to function as described herein.

Processor 110, in the exemplary embodiment, stores sensor data received from sensors 104 in measurement database 120. More specifically, sensor interface 114 receives sensor measurement signals from sensors 104 and converts the signals into sensor data that is stored, by processor 110, in measurement database 120. Moreover, in one embodiment, processor 110, or another device, stores reference data for each system asset 102 in reference database 122. Reference data for each system asset 102 may include any suitable reference data concerning the system asset 102. For example, reference data may be based on expected or predicted performance of a system asset 102 based, for example, on a manufacturer's specifications for the particular system asset 102. Additionally, or alternatively, reference data may be based on measurement data. In some embodiments, the reference data is derived from measurement data for a system asset 102 measured when the particular system asset 102 was newly installed in system 100 and/or functioning at optimal performance. In some embodiments, a user may select to store any desired measurement data for a system asset 102 as reference data for that system asset 102. The reference data may be used by processor 110 to determine the status of the sensor data and/or system asset 102.

In the exemplary embodiment, processor 110 creates a hierarchy 124 of sensor data including a plurality of tiers within memory device 112 for storing and/or categorizing different levels of sensor data, as described more fully herein. More specifically, in the exemplary embodiment, processor 110 creates a first tier 126, a second tier 128, and a third tier 130 within memory device 112. Alternatively, any suitable number of tiers may be created within memory device 112 that enables system 100 to function as described herein. In the exemplary embodiment, first tier 126 is created within measurement database 120, and second and third tiers 128 and 130, respectively, are created within reference database 122. Alternatively, first tier 126, second tier 128, and/or third tier 130 may be created and/or stored within any suitable memory device 112 or portion of memory device 112. For example, first tier 126, second tier 128, and/or third tier 130 may be stored within separate files of the same memory device 112.

Computing device 108, in the exemplary embodiment, is coupled to data acquisition device 106 for receiving data from data acquisition device 106 and/or for displaying sensor data associated with a system asset 102. Computing device 108 includes a processor 132 coupled to a memory device 134, a communication interface 136, a user input device 138, and a display device 140. In the exemplary embodiment, computing device 108 is a mobile device, such as a laptop, a smartphone, a personal digital assistant (PDA), a tablet computer, and/or any other device that functions as described herein. Alternatively, computing device 108 may be a desktop computer, a server computer, and/or any other computing device that enables system 100 to function as described herein. In some embodiments, computing device 108 and data acquisition device 106 may be combined in a single device.

Processor 132 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 134 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 134 includes data and/or instructions that are executable by processor 132 (i.e., processor 132 is programmed by the instructions) to enable processor 132 to perform the functions described herein.

Communication interface 136 may include, without limitation, a network interface controller (NIC), a network adapter, a transceiver, and/or any other communication interface or device that enables computing device 108 to operate as described herein. In the exemplary embodiment, communication interface 136 may connect to data acquisition device 106 using any suitable wired or wireless network and/or communication protocol.

User input device 138 includes, without limitation, a keyboard, a keypad, a touch-sensitive screen, a mouse, a scroll wheel, a pointing device, an audio input device employing speech-recognition software, and/or any suitable device that enables a user to input data into computing device 108 and/or retrieve data from computing device 108. Display device 140 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user. In one embodiment, display device 140 may be a touch-sensitive screen that incorporates aspects of user input device 138, for example, by enabling a user to input data and/or commands through the screen.

Figure 2:
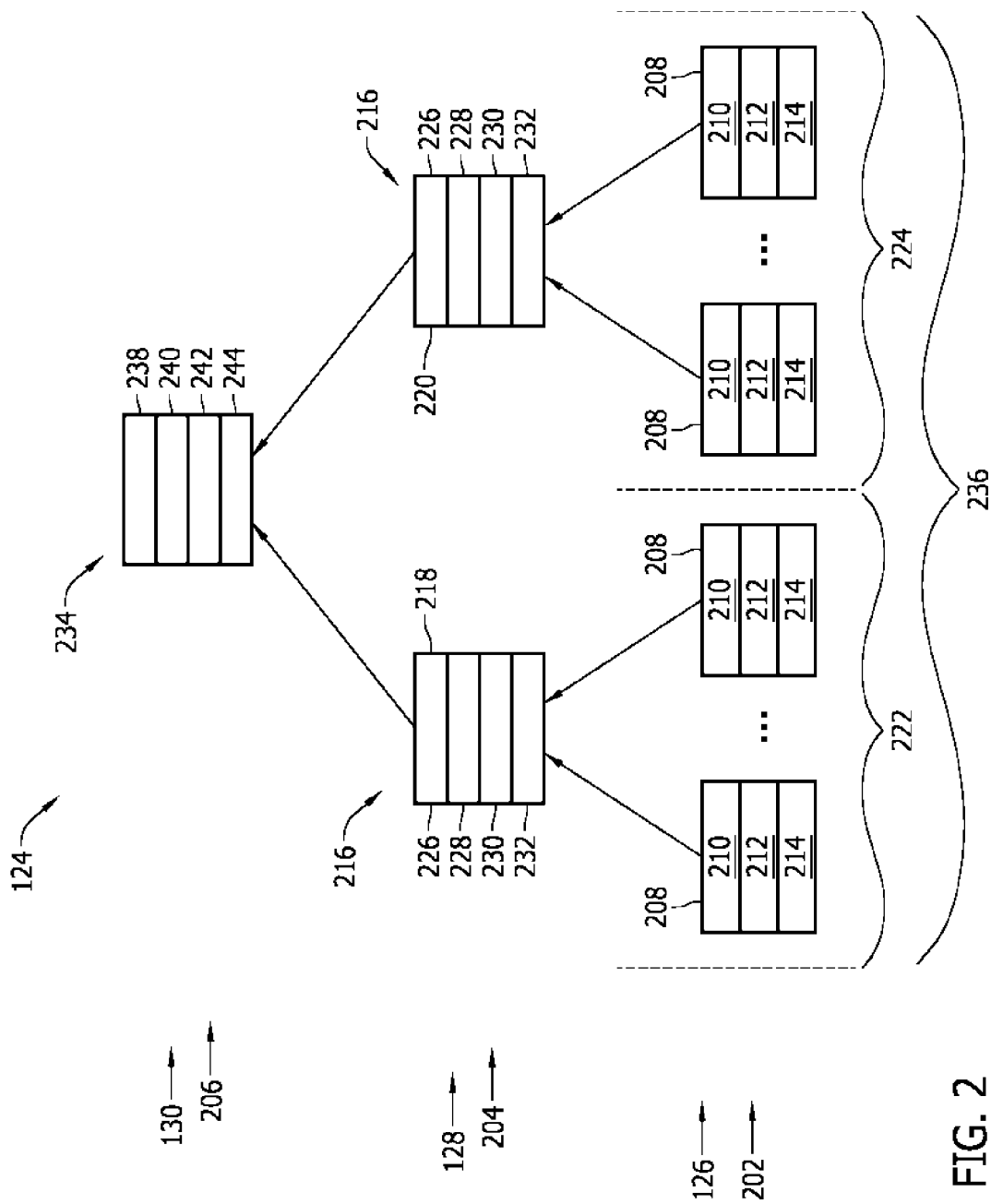
FIG. 2 is a block diagram of an exemplary hierarchy of sensor data that may be used with the system shown in FIG. 1.

FIG. 2 is a block diagram of an exemplary hierarchy 124 of sensor data that may be used with system 100 (shown in FIG. 1).

In the exemplary embodiment, processor 110 (shown in FIG. 1) stores separate levels of sensor data within each tier of hierarchy 124. Each level represents a different abstraction of the sensor data. In the exemplary embodiment, processor 110 stores a first level 202 of sensor data within first tier 126, a second level 204 of sensor data within second tier 128, and a third level 206 of sensor data within third tier 130. In one embodiment, first tier 126 includes raw samples of sensor data and/or a summary set of data, and second tier 128 includes a summary set of data. Additionally or alternatively, in at least some embodiments, second and third tiers 128 and 130 are multiples of each other (i.e., although second and third tiers 128 and 130 may be separately defined such that their respective data are not directly related to each other, in at least some embodiments, a larger tier may be a multiple of a lower tier).

First level 202, in the exemplary embodiment, includes a plurality of samples 208, or discrete measurements, of sensor data. For example, sensor data may be viewed as a continuous stream or as a sequence of samples 208 received from sensor interface 114. Each sample 208 is received by processor 110, in real-time, from sensor interface 114 and is stored, by processor 110, within first tier 126 of memory device 112. Each sample 208 includes a value 210 of sensor data (e.g., a value of the measured operating condition of specific system asset 102), a timestamp 212 indicative of a time that sample 208 was received by processor 110, and a status 214 of sample 208 and/or system asset 102 associated with the sensor data. Status 214 includes, for example, an indication of whether one or more status events occurred, such as whether sample 208 is valid (e.g., that sample 208 includes a valid value 210 for the sensor data), whether sample 208 is invalid (e.g., that sample 208 does not include a valid value 210 for the sensor data), whether system asset 102 associated with sample 208 is in an alarm state, and/or any other status event that enables system 100 to function as described herein.

As used herein, the term "real-time" refers to outcomes occurring substantially simultaneously as a change in the inputs that affects the outcome. For example, a sensor signal may be processed or received in real-time when it is processed or received substantially simultaneously with respect to a time the signal was generated, disregarding a time required to transmit or propagate the signal through circuit components.

In the exemplary embodiment, second level 204 includes a plurality of summaries 216 of samples 208 (also referred to as second level summaries 216), such as a first summary 218 and a second summary 220. Summaries 216 include compilations or abstractions of samples 208 during predetermined time periods. For example, a first summary 218 includes an abstract of samples 208 received during a first time period 222 and a second summary 220 includes an abstract of samples 208 received during a second time period 224. More specifically, in the exemplary embodiment, each summary 216 includes a status compilation 226, one or more statistical abstracts 228 of samples 208 associated with summary 216, an initial sample 230 at which summary 216 begins, and a final sample 232 at which summary 216 ends.

Status compilation 226 is a combination of the status 214 of each sample 208 within the time period associated with summary 216. In one embodiment, the status 214 of each sample 208 is represented by a data structure in which a bit or another portion of the structure is set based on a detected status event associated with the status bit. Accordingly, in such an embodiment, status compilation 226 is a bitwise logical OR of the bits of each status data structure of each sample 208. Status compilation 226 thus reflects all status events that occurred during the time period associated with summary 216.

In the exemplary embodiment, initial sample 230 is the first sample 208 of the time period associated with summary 216, and final sample 232 is the last sample 208 of the time period associated with summary 216. Alternatively, a time that the first sample 208 and the last sample 208 are received may be stored within summary 216 in place of initial sample 230 and final sample 232.

Statistical abstract 228, in the exemplary embodiment, is a statistical calculation of each sample value 210 during the time period associated with summary 216. For example, statistical abstract 228 may include, but is not limited to only including, an average, a median, a maximum, a minimum, and/or a standard deviation of values 210 of samples 208 within the time period. In the exemplary embodiment, a plurality of statistical abstracts 228 are included within summary 216.

The time periods, in the exemplary embodiment, include any suitable time period that enables system 100 to function as described herein, such as a time period encompassing an hour, a day, or a week. In one embodiment, the time period is set in response to user input received by processor 110 via user input device 138 and/or communication interface 116.

Moreover, in the exemplary embodiment, third level 206 includes at least one third level summary 234 (or third summary 234) that is an abstract, or compilation, of second level summaries 216. Third level summary 234 includes a compilation or abstract of second level summaries 216 during a predetermined time period, such as during a third time period 236 that encompasses first time period 222 and second time period 224. Accordingly, in the exemplary embodiment, each third level summary 234 includes a status compilation 238, one or more statistical abstracts 240 of samples 208 associated with third level summary 234, an initial sample 242 at which third level summary 234 begins, and a final sample 244 at which third level summary 234 ends. For example, status compilation 238 of third level summary 234 is a compilation of status compilations 226 of first summary 218 and second summary 220, such as a bitwise logical OR of first summary 218 and second summary 220. In the exemplary embodiment, initial sample 242 of third level summary 234 is initial sample 230 of first summary 218, and final sample 232 of third level summary 234 is final sample 232 of second summary 220. Statistical abstracts 240 of third level summary 234 are compilations of statistical abstracts 228 of first summary 218 and second summary 220. As a further example, in one embodiment, first summary 218 includes statistical abstract 228 that is an average of values 210 of samples 208 within first time period 222, and second summary 220 includes statistical abstract 228 that is an average of values 210 of samples 208 within second time period 224. In such an example, third level summary 234 includes statistical abstract 240 that is an average of the two average values, i.e., an average of the first summary average and the second summary average.

It should be recognized that hierarchy 124 may include any suitable number of levels with any suitable number of summaries. For example, additional summaries may be included above third level summary 234, or third level summary 234 may be omitted such that only second level summaries 216 are included within hierarchy 124.

Figure 3:
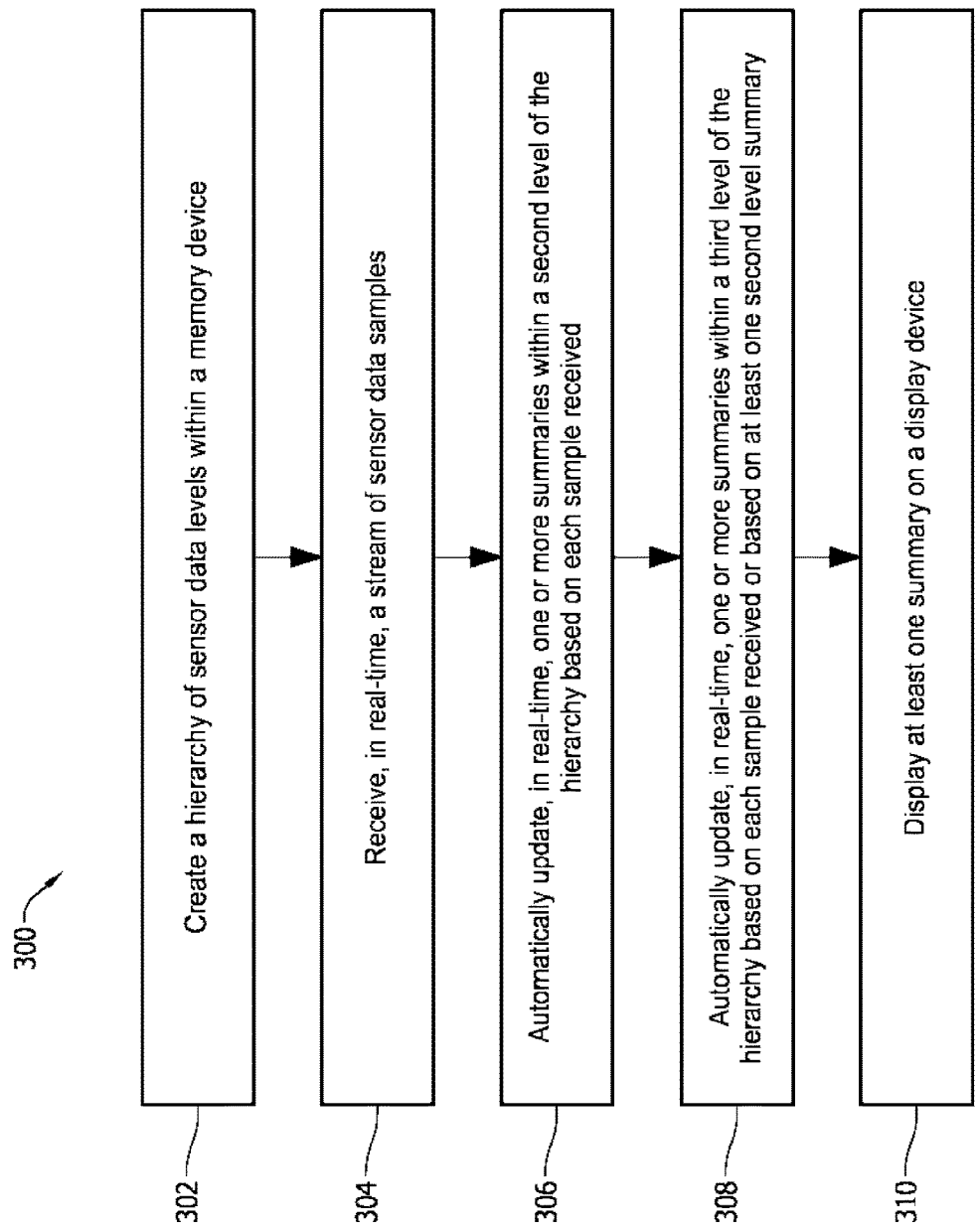
FIG. 3 is a flow diagram of an exemplary method of monitoring a system asset that may be executed by the system shown in FIG. 1.

FIG. 3 is a flow diagram of an exemplary method 300 of monitoring a system asset, such as system asset 102, that may be used with system 100 (both shown in FIG. 1). In the exemplary embodiment, method 300 is embodied within a plurality of computer-executable instructions stored within memory device 112 that are executable by a processor, such as processor 110 (both shown in FIG. 1). Moreover, in the exemplary embodiment, when processor 110 executes the instructions, the instructions program processor 110 to perform the steps of method 300.

In the exemplary embodiment, method 300 includes creating 302 a hierarchy of sensor data levels, such as hierarchy 124, within memory device 112. For example, processor 110 may create 302 first tier 126 for storing first level 202 of sensor data, second tier 128 for storing second level 204 of sensor data, and third tier 130 for storing third level 206 of sensor data.

Processor 110 receives 304, in real-time, a stream or sequence of sensor data samples 208 from sensor interface 114. Samples 208 are stored in first level 202 within memory device 112. Processor 110 automatically updates 306, in real-time, one or more summaries 216 within second level 204 of hierarchy 124 based on each sample 208 received. For example, as each sample 208 is received 304 within the time period associated with summary 216, processor 110 updates statistical abstracts 228 of summary 216 based on value 210 of sample 208, and updates status compilation 226 based on status 214 of sample 208. In the exemplary embodiment, processor 110 updates 306 summary 216 substantially simultaneously with respect to the receipt of sample 208.

Processor 110 also automatically updates 308, in real-time, one or more summaries, such as third level summary 234, within third level 206 of hierarchy 124 based on each sample 208 received and/or based on at least one second level summary 216. In the exemplary embodiment, processor 110 automatically updates second level summaries 216 and third level summary 234 at the same time when each sample 208 is received. Alternatively, processor 110 may update third level summary 234 after second level summaries 216 have been updated.

At least one summary, such as second level summary 216 and/or third level summary 234, is displayed 310 on a display device. For example, processor 110 may transmit data representative of second level summaries 216 and/or third level summary 234 to computing device 108 so that the data may be displayed on display device 140.

A technical effect of the systems, devices, and methods described herein includes at least one of (a) creating a hierarchy of sensor data within a memory device, wherein the hierarchy includes a first tier and a second tier; (b) receiving sensor data representative of an operating condition of a system asset; (c) storing a first level of sensor data in a first tier; (d) storing a second level of sensor data in a second tier; and (e) displaying data representative of a second level of sensor data on a display device.

The system described herein efficiently monitors operation of one or more system assets. A sensor detects and/or measures operating conditions of a system asset. The sensor transmits a measurement signal to a data acquisition device that samples and digitizes the measurement signal to produce a sequence of sensor data samples. The sensor data samples are transmitted to a processor. The processor creates a hierarchy of sensor data, including a plurality of levels, within a memory device. The processor stores the samples in a first of the plurality of levels, creates at least one summary of the samples within a first period of time, and stores the summary in a second of the plurality of levels. The summary is a compilation of sensor data values and status of the samples within the first period of time, and the summary includes a timestamp indicative of a time that each sample was received. Additional levels in the hierarchy may be created and/or filled with further summaries or abstracts, e.g., abstracts of the summaries within a lower level of the hierarchy. Each summary is updated in real-time when the samples or summaries at a lower level of the hierarchy are received and/or updated. Accordingly, as described herein, summaries may be displayed and/or accessed at a later time without having to calculate or generate the summaries from the underlying samples at the later time. In addition, the samples may be deleted to recapture storage space while retaining the compilation of the samples within the summaries.

Exemplary embodiments of methods and devices for use in monitoring operation of one or more system assets are described above in detail. The methods and devices are not limited to the specific embodiments described herein, but rather, components of the systems and/or devices and/or steps of the methods may be utilized independently and separately from other components and/or steps described herein. For example, the data acquisition device may also be used in combination with other systems and methods, and is not limited to practice with only the system or the computing device as described herein. Rather, the exemplary embodiment can be implemented and utilized in connection with many other power system or industrial applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for use in monitoring operation of a system asset, said device comprising:
    an interface for receiving sensor data representative of an operating condition of a system asset being monitored;
    a memory device for storing the sensor data; and
    a processor coupled to said interface and to said memory device, said processor configured to:

create a hierarchy of sensor data within said memory device, wherein the hierarchy includes a first tier and a second tier;

store a first level of the sensor data in the first tier, the first level of the sensor data including a plurality of samples, each sample including a value of a measured operating condition of the monitored system asset, a status of the sensor data, and a time stamp indicative of a time of receipt of the sensor data by the processor wherein the status of the sensor data is represented by a status data structure in which a bit is set based on a detected status event associated with the status bit;

generate a second level of the sensor data including a plurality of second level summaries, each second level summary including, a second level status compilation combining the status of each sample received by the processor during respective predetermined time periods according to a bitwise logical OR of the bits of each status data structure of each sample; and at least one second level statistical abstract of samples received by the processor during the respective predetermined time periods; and store the second level of the sensor data in the second tier.

2. The device of claim 1, wherein said processor is further configured to:

receive the plurality of samples from said interface in real time;

generate each sensor data status and store the plurality of samples in the first level of sensor data in real-time.

3. The device of claim 1, further comprising:

a data acquisition device comprising the interface; and a display device coupled to said data acquisition device, said display device configured to display data representative of the second level of the sensor data.

4. The device of claim 1, wherein the hierarchy includes a third tier and the processor is configured to store a third level of the sensor data in the third tier, the third level including at least one third level summary including a third level status compilation of the second level status compilations of least two second level summaries and at least one third level statistical abstract of the second level statistical abstracts of the at least two second level summaries.

5. The device of claim 4, wherein the third level status compilation is a bitwise logical OR of the bits of the second level status compilations of the at least two second level status compilations.

6. A method of monitoring a system asset, said method comprising:

creating a hierarchy of sensor data within a memory device, wherein the hierarchy includes a first tier and a second tier;

receiving sensor data representative of an operating condition of a system asset being monitored;

storing a first level of the sensor data in the first tier, the first level including a plurality of samples, each sample including a value of a measured operating condition of the monitored system asset, a status of the sensor data, and a time stamp indicative of a time of receipt of the sensor data;

generating a second level of the sensor data including a plurality of second level summaries, each second level summary including a second level status compilation combining the status of each sample received during respective predetermined time periods according to a bitwise logical OR of the bits of each status data structure of each sample, and at least one second level statistical abstract of samples received during the respective predetermined time periods;

storing the second level of the sensor data in the second tier; and displaying data representative of the second level of the sensor data on a display device.

7. The method of claim 6, wherein receiving sensor data comprises receiving real-time samples of sensor data from a sensor interface.

8. The method of claim 6, wherein the hierarchy includes a third tier and the method further comprises storing a third level of the sensor data in the third tier, the third level including at least one third level summary including a third level status compilation of the second level status compilations of least two second level summaries and at least one third level statistical abstract of the second level statistical abstracts of the at least two second level summaries.

9. The method of claim 8, wherein the third level status compilation is a bitwise logical OR of the bits of the second level status compilations of the at least two second level status compilations.

* * * * *